(12) United States Patent
Rajkotia et al.

(10) Patent No.: US 7,512,101 B2
(45) Date of Patent: Mar. 31, 2009

(54) APPARATUS AND METHOD FOR ENABLING DIFFERENT REDUCED SLOT CYCLE MODES IN A WIRELESS NETWORK

(75) Inventors: Purva R. Rajkotia, Plano, TX (US); Sanjaykumar Kodali, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 770 days.

(21) Appl. No.: 10/888,034

(22) Filed: Jul. 9, 2004

(65) Prior Publication Data

US 2005/0036464 A1 Feb. 17, 2005

Related U.S. Application Data

(60) Provisional application No. 60/495,461, filed on Aug. 15, 2003.

(51) Int. Cl.
*H04J 3/00* (2006.01)

(52) U.S. Cl. .................................. 370/336; 370/347
(58) Field of Classification Search ................. 370/376, 370/347, 350, 711; 455/434, 515
See application file for complete search history.

(56) References Cited

U.S. PATENT DOCUMENTS

| 6,822,973 B2 * | 11/2004 | Kelley et al. ............. 370/503 |
| 7,283,818 B2 * | 10/2007 | Rajkotia et al. ........... 455/434 |
| 2004/0160942 A1 * | 8/2004 | Kelley et al. ............. 370/350 |

* cited by examiner

*Primary Examiner*—Sam Bhattacharya

(57) ABSTRACT

A wireless network base station in communication with a mobile station enables the use of the reduced slot cycle mode by the mobile station. The base station comprises a reduced slot cycle controller that causes the base station to transmit an enhanced release order message to the mobile station to transition the mobile station from a traffic state to an idle state. The enhanced release order message comprises a first data field containing a first reduced slot cycle index (SCI) value to be used by the mobile station.

20 Claims, 7 Drawing Sheets

APPARATUS AND METHOD FOR ENABLING DIFFERENT REDUCED SLOT CYCLE MODES IN A WIRELESS NETWORK

CROSS-REFERENCE TO RELATED APPLICATION AND CLAIM OF PRIORITY

The present invention is related to that disclosed in U.S. Provisional Patent Application Ser. No. 60/495,461, filed Aug. 15, 2003, entitled "Reduced Slot Cycle Support". U.S. Provisional Patent Application Ser. No. 60/495,461 is assigned to the assignee of the present application. The subject matter disclosed in U.S. Provisional Patent Application Ser. No. 60/495,461 is hereby incorporated by reference into the present disclosure as if fully set forth herein. The present invention hereby claims priority under 35 U.S.C. §119(e) to U.S. Provisional Patent Application Ser. No. 60/495,461.

TECHNICAL FIELD OF THE INVENTION

The present invention is generally related to wireless networks and, in particular, to a wireless network capable of enabling different reduced slot cycle modes.

BACKGROUND OF THE INVENTION

Wireless communication systems have become ubiquitous in society. Business and consumers use a wide variety of fixed and mobile wireless terminals, including cell phones, pagers, Personal Communication Services (PCS) systems, and fixed wireless access devices (e.g., vending machine with cell phone capability). Wireless service providers continually try to create new markets for wireless devices and expand existing markets by making wireless devices and services cheaper and more reliable. The prices of wireless devices have decreased to the point where nearly everyone can afford them. To continue to attract new customers, wireless service providers are implementing new services, especially digital data services that, for example, enable a user (or subscriber) to browse the Internet and to send and receive e-mail.

Mobile stations (e.g., cell phones, PCS handsets, portable computers, telemetry devices, and the like) frequently operate from an external power source connected to the mobile station. When the external power source is not connected, an internal battery provides a limited period of operation. Mobile stations that operate from batteries for longer periods of time offer increased value to users and competitive advantages for service providers and equipment vendors.

The duration of mobile station battery operation has often been extended using techniques that lower power consumption when the mobile station is in an idle state and not transferring voice or data traffic. A mobile station may enable one or more power saving configurations when it is in the idle state. For instance, the mobile station may disable its transmitter during the idle state, decreasing the amount of power required for idle state operation. A mobile station may further reduce its idle state power requirements by enabling a slotted mode of operation with a base station.

A mobile station enters the idle state when the mobile station is turned on, is synchronized with the system, and has no calls in progress. During the idle state, a mobile station actively listens to a paging channel for information. This information includes overhead messages, such as system parameter messages, as well as messages directly addressed to the mobile station from a base station. A mobile station in the idle state may operate from a battery or from an external power source.

During the idle state, the mobile station may communicate with a base station in a non-slotted or a slotted mode. A typical paging channel slot is an 80-millisecond time slot within a paging slot cycle. The paging slot cycle ranges from 16 time slots (1.28 seconds) to 2048 time slots (163.84 seconds). In the non-slotted mode, the mobile station monitors all paging channel slots for messages from the base station. In the slotted mode, the mobile station only monitors a selected subset of the paging channel slots for messages from the base station. During time periods when the mobile station is not monitoring the selected subset of paging channel slots, power is turned off in the mobile station RF receiver in order to save additional power. A mobile station extends the battery supply operating life by entering a slotted mode of operation with the base station because the mobile station receiver consumes power only during selected slot cycles rather than across the entire paging cycle.

In earlier wireless networks, such as Release B of cdma2000 (i.e., IS-2000-B), the mobile station could select a full slot cycle index, r, between 0 and 7 (i.e., 000-111). The slot cycle index, r, gives the period, P, of the slotted mode of operation according to the equation:

$$P=(2)^r \times 1.28 \text{ seconds}. \quad \text{[Eqn. 1]}$$

Thus, for example, if the full slot cycle index, r, is 0, the period of the slotted mode is 1.28 seconds. If the full slot cycle index, r, is 7, the period of the slotted mode is 163.84 seconds.

However, the latest generation of wireless terminals, particularly cell phones and other mobile stations, incorporate new features and applications that require very fast messaging. Many of these new features cannot operate with full cycle slotted mode periods of 1.28 seconds or greater. For example, many cell phones and other wireless mobile stations (e.g., Palm Pilot) support interactive gaming applications that enable the operator of one mobile station to play against the operator of another mobile station. However, a gaming application that requires fast, real-time interactions cannot properly operate in a slotted mode that has a minimum period of 1.28 seconds.

Another new application that is adversely affected by full cycle slotted mode operation is Push-to-Talk service, such as the Direct Connect[SM] service available from Nextel. A Push-to-Talk service allows two mobile stations to operate as walkie-talkies. A call connection is set up between a first mobile station and a second mobile station. After the call connection is established, the operators may let both mobile stations enter idle states. At any point in time, the operator of the first mobile station can simply press a button on the first mobile station and say, "Hey what are you up to?" and the operator of the second mobile station can hear the voice message immediately and respond. However, a Push-to-Talk application cannot properly operate with a slotted mode that has a minimum period of 1.28 seconds.

In order to perform fast messaging in gaming applications and Push-to-Talk services, the latest generation of mobile stations are capable of entering a reduced slot cycle mode (or negative slot cycle mode) when the mobile station is in a slotted mode of operation. In reduced slot cycle mode, the mobile station selects a reduced slot cycle index, r, between −4 and 7. As before, the slot cycle index, r, gives the period, P, of the slotted mode of operation according to the equation:

$$P=(2)^r \times 1.28 \text{ seconds}. \quad \text{[Eqn. 2]}$$

Because the slot cycle index, r, can be a negative value, slot cycle periods of less than 1.28 seconds are possible. For example, if the reduced slot cycle index, r, is −4, the reduced slot cycle period of the slotted mode is 80 milliseconds. If the reduced slot cycle index, r, is −3, the reduced slot cycle period of the slotted mode is 160 milliseconds. If the reduced slot cycle index is −2, the reduced slot cycle period of the slotted mode is 320 milliseconds, and so forth.

Unfortunately, the widespread use of reduced slot cycle mode by a large number of mobile stations creates considerable scheduling problems in the base station. When paging slot cycles are 1.28 seconds or greater, the base station has the luxury of being able to flexibly schedule the transmission of paging messages to nearby mobile stations. However, when slot cycles are only 80 milliseconds long, the base station is less able to schedule transmissions in an optimal manner. Under some heavily loaded conditions, the benefits of shorter paging cycles become reduced.

Furthermore, certain applications, such as QCHAT, may require a first group of mobile stations to monitor the paging channel of a base station more frequently than a second group of mobile stations. Continually operating the second group of mobile stations in the reduced slotted mode unnecessarily drains the batteries of the second group of mobile stations and reduces battery life. However, operating the first group of mobile stations in a normal mode of operation (non-reduced slotted mode) has a negative impact on application performance.

Therefore, there exists a need for improved systems and methods of enabling the use of different reduced slot cycle index values by mobile stations in a wireless network.

SUMMARY OF THE INVENTION

The present invention discloses a technique for selecting a reduced slot cycle index (SCI) value for use by a particular mobile station using the traffic channel without impacting the battery life and the application performance of other mobile stations.

To address the above-discussed deficiencies of the prior art, it is a primary object of the present invention to provide, for use in a wireless network, a base station capable of enabling the use of the reduced slot cycle mode by each of a plurality of mobile stations communicating with the base station. According to an advantageous embodiment, the base station comprises a reduced slot cycle controller capable of causing the base station to transmit an enhanced release order message to a first one of the plurality of mobile stations to transition the first mobile station from a traffic state to an idle state, wherein the enhanced release order message comprises a first data field containing a first reduced slot cycle index value to be used by the first mobile station.

According to one embodiment of the present invention, the reduced slot cycle controller is further capable of causing the base station to transmit an additional enhanced release order message to a second one of the plurality of mobile stations, wherein the additional enhanced release order message comprises a first data field containing a second reduced slot cycle index value to be used by the second mobile station.

According to another embodiment of the present invention, the reduced slot cycle controller is further capable of selecting the first reduced slot cycle index value based on a first service associated with the first mobile station and the second reduced slot cycle index value based on a second service associated with the second mobile station.

According to still another embodiment of the present invention, the reduced slot cycle controller is further capable of receiving a response message from the first mobile station, wherein said response message comprises a first data field containing a second reduced slot cycle index value to be used by the first mobile station.

According to yet another embodiment of the present invention, the second reduced slot cycle index value and the first reduced slot cycle index value are the same, and wherein the base station operates at the first reduced slot cycle index value to page said first mobile station.

According to a further embodiment of the present invention, the second reduced slot cycle index value and the first reduced slot cycle index value are different.

According to a still further embodiment of the present invention, the base station operates at the second reduced slot cycle index value to page the first mobile station.

According to a yet further embodiment of the present invention, the base station operates at a normal slot cycle index value to page said first mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
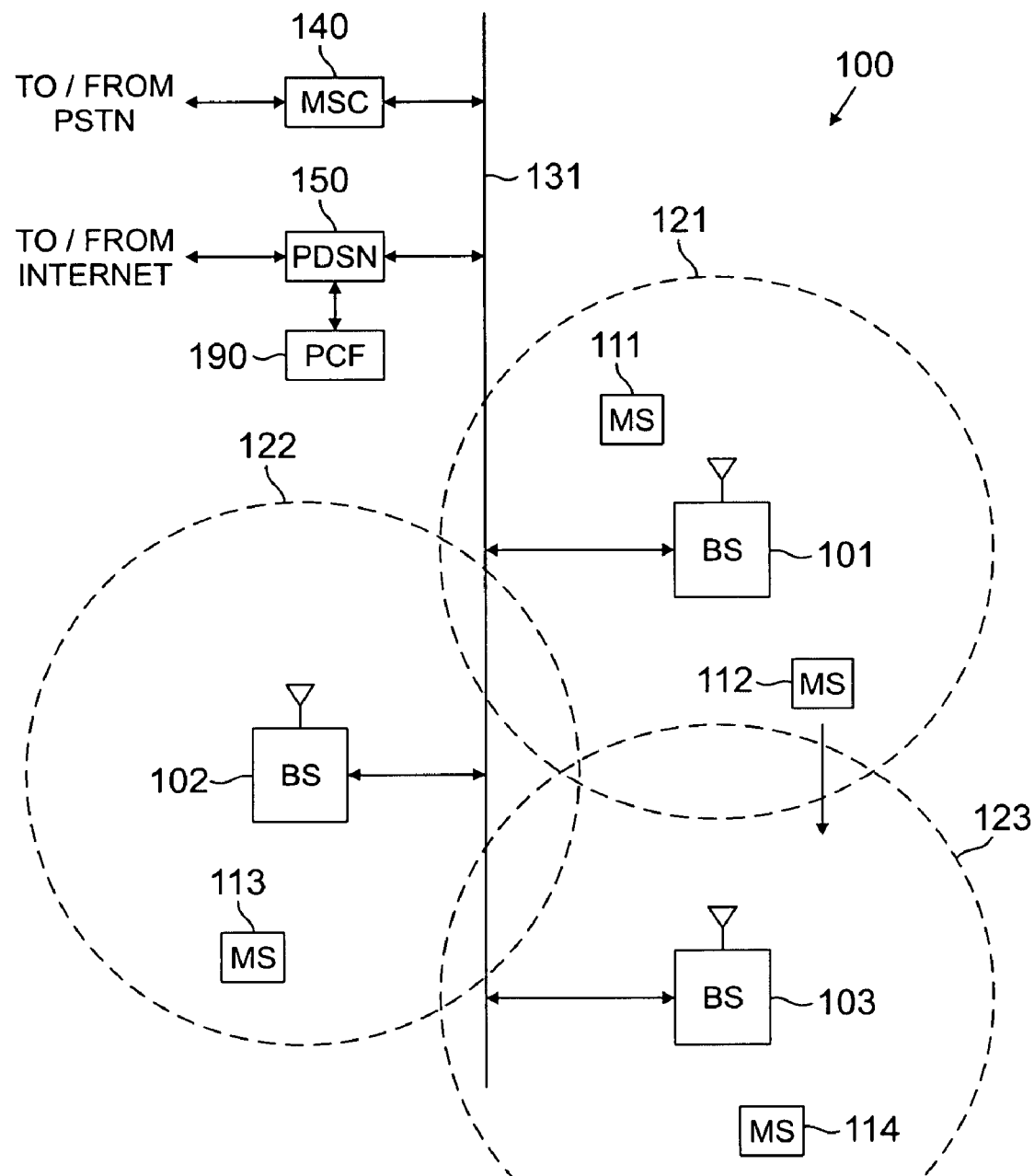
FIG. 1 illustrates an exemplary wireless network in which base stations enable the use of the reduced slot cycle mode of operation by mobile stations according to the principles of the present invention.

FIG. 1 illustrates exemplary wireless network 100 in which base stations control the use of the reduced slot cycle mode of operation by mobile stations according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000-C standard (i.e., Release C of cdma2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, the mobile stations operating in wireless network 100 are capable of operating in a reduced slot cycle mode of operation (also called a negative slot cycle mode of operation). However, in order to use different optimum reduced slot cycle index values for each mobile station 112-114 in wireless network 100, base stations 101-103 of wireless network 100 and mobile stations 112-114 are capable of selecting the optimum reduced slot cycle index value for each mobile station 112-114.

Figure 2:
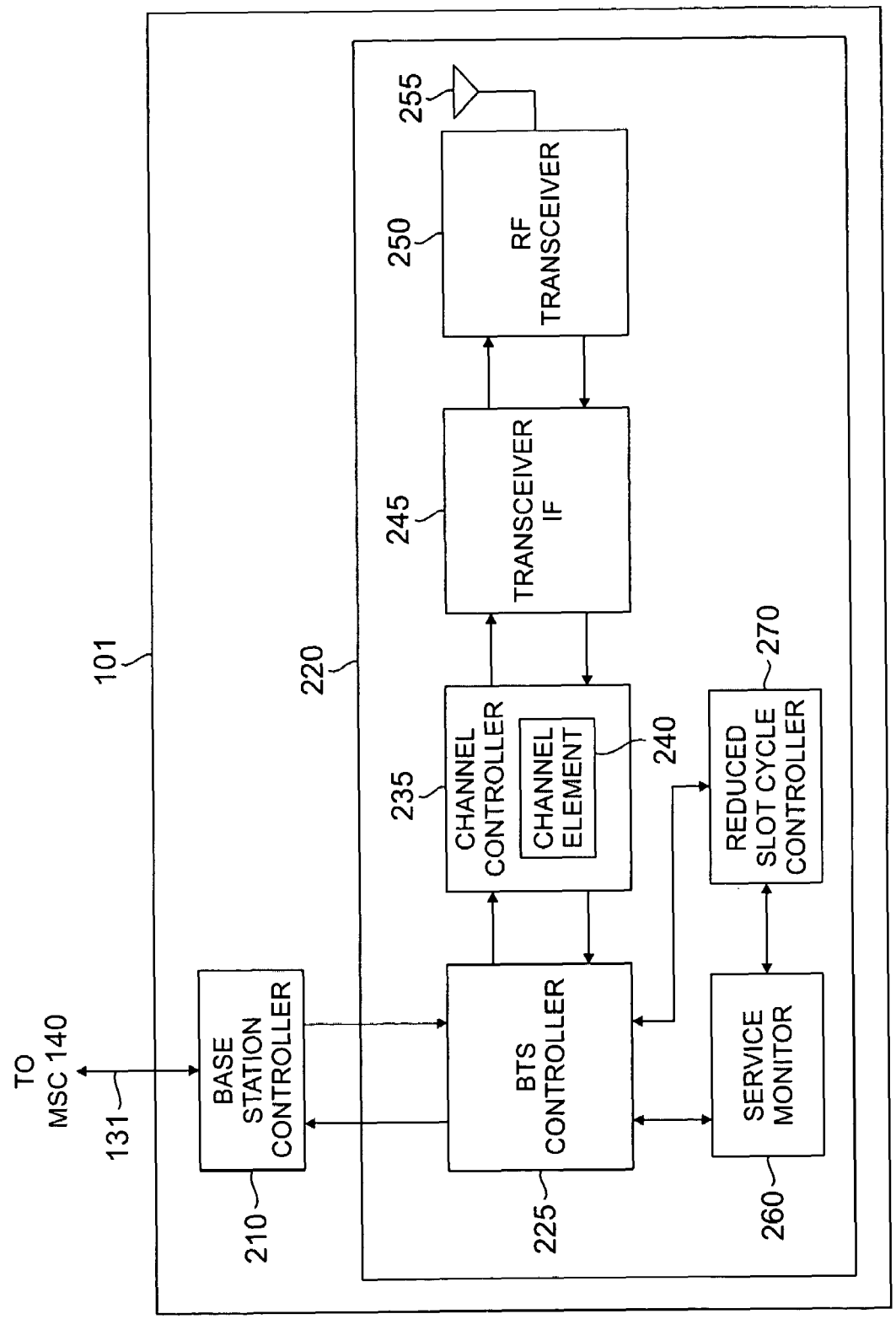
FIG. 2 illustrates in greater detail an exemplary base station according to one embodiment of the present invention.

FIG. 2 illustrates exemplary base station 101 in greater detail according to one embodiment of the present invention. Base station 101 comprises base station controller (BSC) 210 and base transceiver subsystem (BTS) 220. Base station controllers and base transceiver subsystems were described previously in connection with FIG. 1. BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises traffic monitor 260 and reduced slot cycle controller 270.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In an advantageous embodiment of the present invention, the channel elements communicate according to a code division multiple access (CDMA) protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to an exemplary embodiment of the present invention, base station 101 is capable of selectively assigning particular mobile stations to different reduced slot cycle modes, so that mobile stations in the same cell may operate at different, optimum slot cycle rates. To accomplish this, service monitor 260 receives and maintains service information from MSC 140 regarding the type of service provided by BTS controller 225 to each of the mobile stations handled by BS 101. For example, service types may include normal telecommunication services that do not need to operate at the reduced slot cycle index, gaming services, Push-to-Talk services, QCHAT services or any other type of telecommunication service. Service monitor 260 further monitors the reduced slot cycle index value for each mobile station operating in reduced slot cycle mode.

Reduced slot cycle controller 270 receives the service information from service monitor 260, and causes BTS controller 225 to transmit to one or more target mobile stations enhanced release order messages in traffic channels in which different reduced slot cycle index (RSCI) values are specified for different mobile stations. Reduced slot cycle controller 270 selects a reduced slot cycle index value for a particular mobile station based on the service information associated with the particular mobile station.

When each target mobile station receives the enhanced release order message, each target mobile station operates in the assigned slot cycle index mode, if possible. Thereafter, base station 101 schedules the transmission of messages in the paging channel according to the slot cycle indexes assigned.

In FIG. 2, reduced slot cycle controller 270 and service monitor 260 are associated with base transceiver subsystem 220. It should be understood that this configuration is by way of illustration only and should not be construed to limit the scope of the present invention. Those skilled in the art will understand that in other embodiments, reduced slot cycle controller 270 and service monitor 260 may be associated with base station controller 210. In still other embodiments, reduced slot cycle controller 270 and service monitor 260 may be associated with both BTS 220 and BSC 210.

Figure 3:
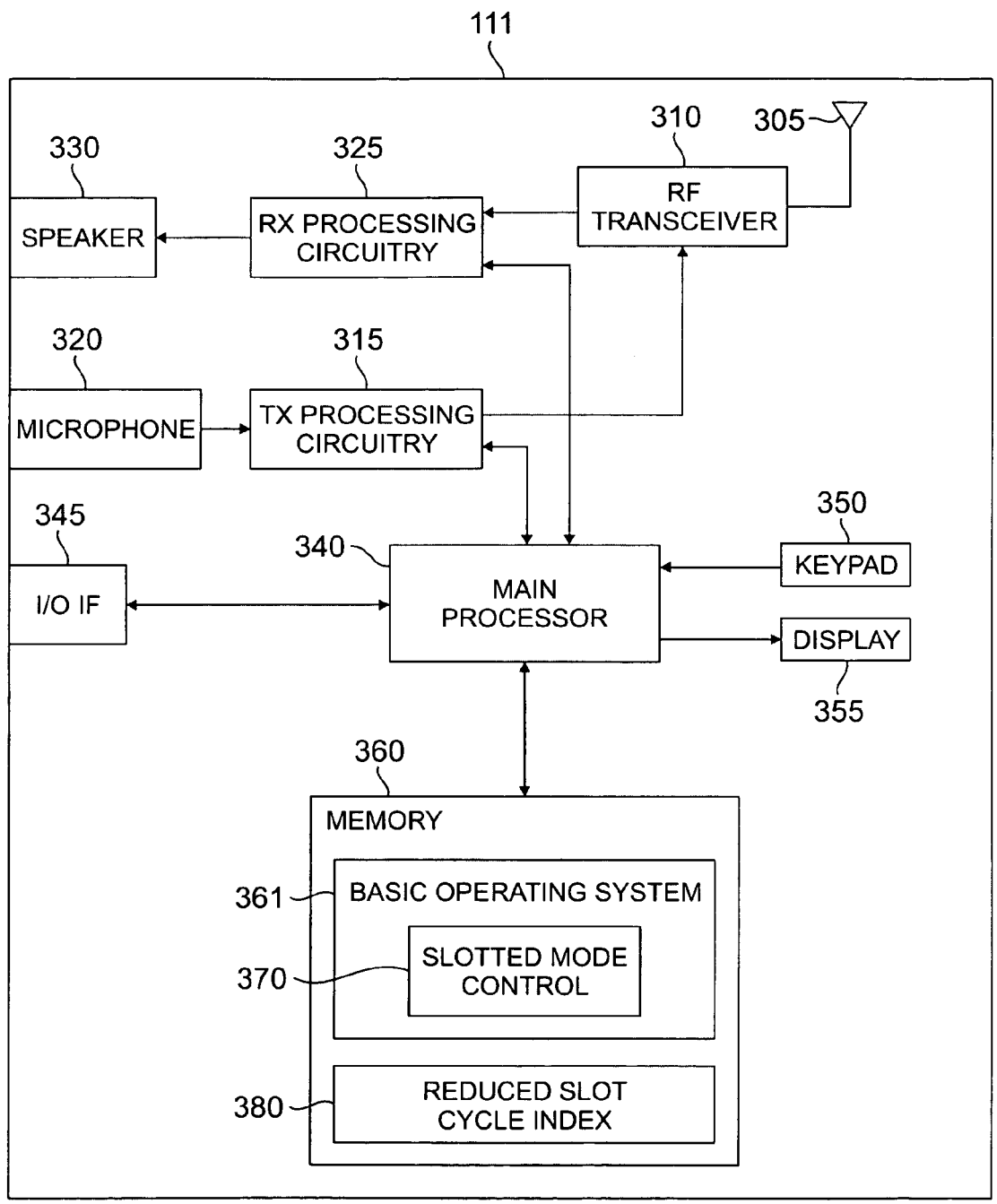
FIG. 3 illustrates an exemplary wireless mobile station according to an advantageous embodiment of the present invention.

FIG. 3 illustrates wireless mobile station 111 according to an advantageous embodiment of the present invention. Wireless mobile station 111 comprises antenna 305, radio frequency (RF) transceiver 310, transmit (TX) processing circuitry 315, microphone 320, and receive (RX) processing circuitry 325. MS 111 also comprises speaker 330, main processor 340, input/output (I/O) interface (IF) 345, keypad 350, display 355, and memory 360. Memory 360 further comprises basic operating system (OS) program 361, slotted mode control algorithm 370, and reduced slot cycle index field 380.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In an advantageous embodiment of the present invention, main processor 340 is a microprocessor or microcontroller. Memory 360 is coupled to main processor 340. According to an advantageous embodiment of the present invention, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless mobile station 111. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 111 with the ability to connect to other devices such as laptop computers and handheld computers. I/O interface 345 is the communication path between these accessories and main controller 340.

Main processor 340 is also coupled to keypad 350 and display unit 355. The operator of mobile station 111 uses keypad 350 to enter data into mobile station 111. Display 355 may be a liquid crystal display capable of rendering text and/or at least limited graphics from web sites. Alternate embodiments may use other types of displays.

Basic operating system 361 includes slotted mode control algorithm 370. According to the principles of the present invention, when mobile station 111 enters an idle state, main processor 340 may execute slotted mode control algorithm 370 and thereby enter a full slot cycle mode of operation or a reduced slot cycle mode of operation. Slotted mode control algorithm 370 checks the value stored in reduced slot cycle index field 380 in order to determine whether to operate in full slot cycle mode or reduced slot cycle mode.

In one embodiment, reduced slot cycle index field 380 stores the value of the reduced slot cycle index transmitted by base station 101 in the enhanced release order message. In other embodiments, reduced slot cycle index field 380 stores one or more predetermined preferred values of the reduced slot cycle index for mobile station 111. If the reduced slot cycle index value received in the enhanced release order message from base station 101 does not match one of the preferred values of the reduced slot cycle index stored in field 380, slotted mode control algorithm 370 causes mobile station 111 to transmit a preferred reduced slot cycle index value to base station 101 in a response message to the enhanced release order message. The response message can be, for example, a release order message or an acknowledgment message.

Figure 4:
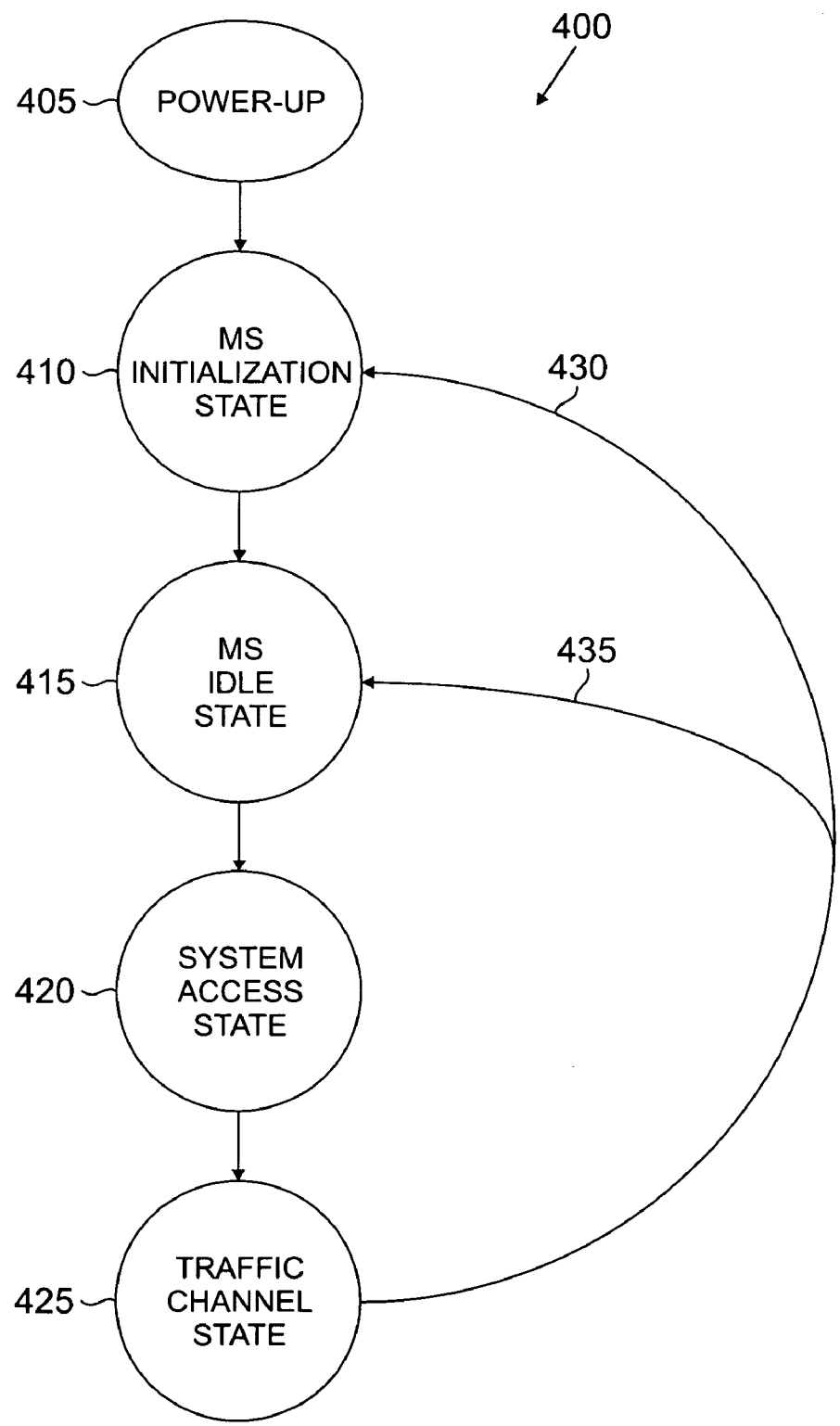
FIG. 4 is a state diagram illustrating exemplary logical states of the mobile station.

FIG. 4 depicts state diagram 400, which illustrates exemplary logical states of a mobile station (e.g., mobile station 112). Upon powering up 405 (i.e., turning mobile station 112 "ON"), mobile station 112 enters an initialization state 410. During the initialization state 410, mobile station 112 acquires network information (e.g., SID, NID, etc.) and system timing information (e.g., slot cycle index value) from a serving base station (e.g., base station 101). Once mobile station 112 has fully acquired the network and system timing information from base station 101, mobile station 112 enters an idle state 415.

During the idle state 415, mobile station 112 may communicate with base station 101 in a non-slotted or a slotted mode. In the non-slotted mode, mobile station 112 monitors all paging channel slots for messages from base station 101. In the slotted mode, mobile station 112 only monitors a selected subset of the paging channel slots for messages from the base station depending on the slot cycle index value (or reduced slot cycle index value). During time periods when mobile station 112 is not monitoring the selected subset of paging channel slots, power is turned off in the mobile station RF receiver in order to save additional power.

When mobile station 112 receives a paging message requiring an acknowledgment or response, originates a call or performs a registration, mobile station 112 enters a system access state 420. During the system access state, base station 101 may allocate a traffic channel to mobile station 112, which causes mobile station 112 to enter a traffic channel state 425. The traffic channel state 425 continues for the duration of the traffic channel allocation to mobile station 112.

In one embodiment, upon the termination of the application or service that used the allocated traffic channel (e.g., when disconnecting a call), base station 101 sends a release order message to mobile station 112 that causes mobile station 112 to re-enter the initialization state 410. In other embodiments, if the serving base station (i.e., serving cell) has not changed during the traffic channel state 425 (i.e., a handoff to another base station has not occurred), base station 101 sends an enhanced release order message to mobile station 112 that allows mobile station 112 to transition directly to the idle state 410. The enhanced release order message includes the reduced slot cycle index value at which base station 101 wants mobile station 112 to operate.

Figure 5:
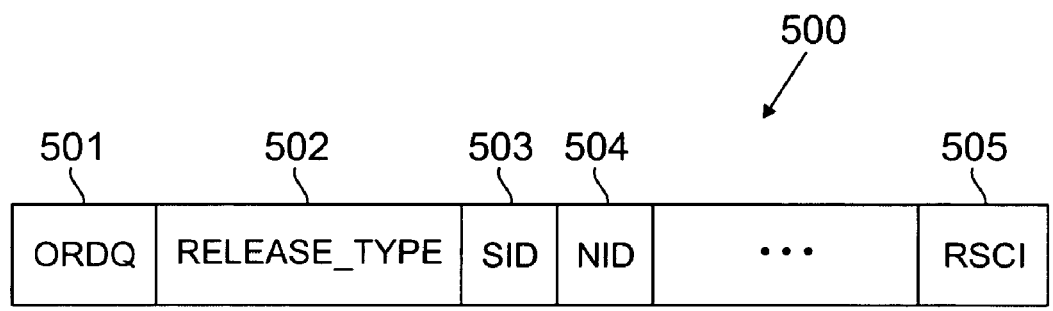
FIG. 5 illustrates a technique for the base station to select the slot cycle index value of a particular mobile station using an enhanced release order message according to one embodiment of the present invention.

FIG. 5 illustrates a technique for enabling the use of a particular slot cycle index for a particular mobile station using an enhanced release order message 500 sent from the base station to the mobile station according to one embodiment of the present invention. The enhanced release order message 500 in FIG. 5 comprises, among other fields, an order qualification code field 501, a release type field 502, a System Identification (SID) field 503, a Network Identification (NID) field 505 and a reduces slot cycle index (RSCI) field 505.

This technique is capable of using different RSCI values specific to each individual mobile station within a cell of a base station. Accordingly, the base station transmits the enhanced release order message containing the preferred RSCI value for a particular mobile station in the traffic channel to cause the mobile station to transition from the traffic state to the idle state with the RSCI value. Since a separate enhanced release order message is used for each mobile station transitioning out of the traffic state, flexibility is provided for changing the RSCI to different values within the same cell.

Figure 6:
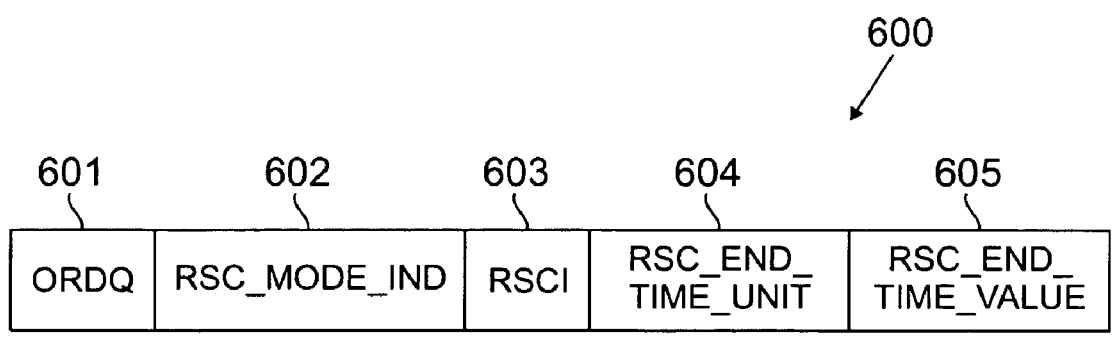
FIG. 6 illustrates a technique for the mobile station to select the slot cycle index value using a release order message according to another embodiment of the present invention.

FIG. 6 illustrates a technique for enabling the use of a particular slot cycle index for a particular mobile station using a release order message 600 sent from the mobile station to the base station according to another embodiment of the present invention. The release order message 600 in FIG. 6 comprises an order qualification code (ORDQ) field 601, a reduced slot cycle mode indicator (RSC_MODE_IND) field 602, a reduced slot cycle index (RSCI) field 603, a reduced slot cycle mode end time unit (RSC_END_TIME_UNIT) field 604 and a reduced slot cycle mode end time value (RSC_END_TIME_VALUE) field 605.

In this technique, the RSC_MODE_IND field 602 is set to "1" to indicate that the mobile station will operate in reduced slot cycle mode following release of the traffic channel. If RSC_MODE_IND field 602 is set to "1", the RSCI field 603 is set to the value of the reduced slot cycle index at which the mobile station will operate. If the reduced slot cycle index value received by the mobile station in the enhanced release order message 500 is acceptable to the mobile station, the mobile station will include the same reduced slot cycle index value in the RSCI field 603. Otherwise, the mobile station will set the RSCI field 603 to a preferred reduced slot cycle index value for the mobile station. The fields RSC_END_TIME_UNIT 604 and RSC_END_TIME_VALUE 605 enable the mobile station to optionally indicate the system time (modulo 16) in units of time specified by RSC_END_TIME_UNIT field 604 at which the mobile station will exit the reduced slot cycle mode.

Figure 7:
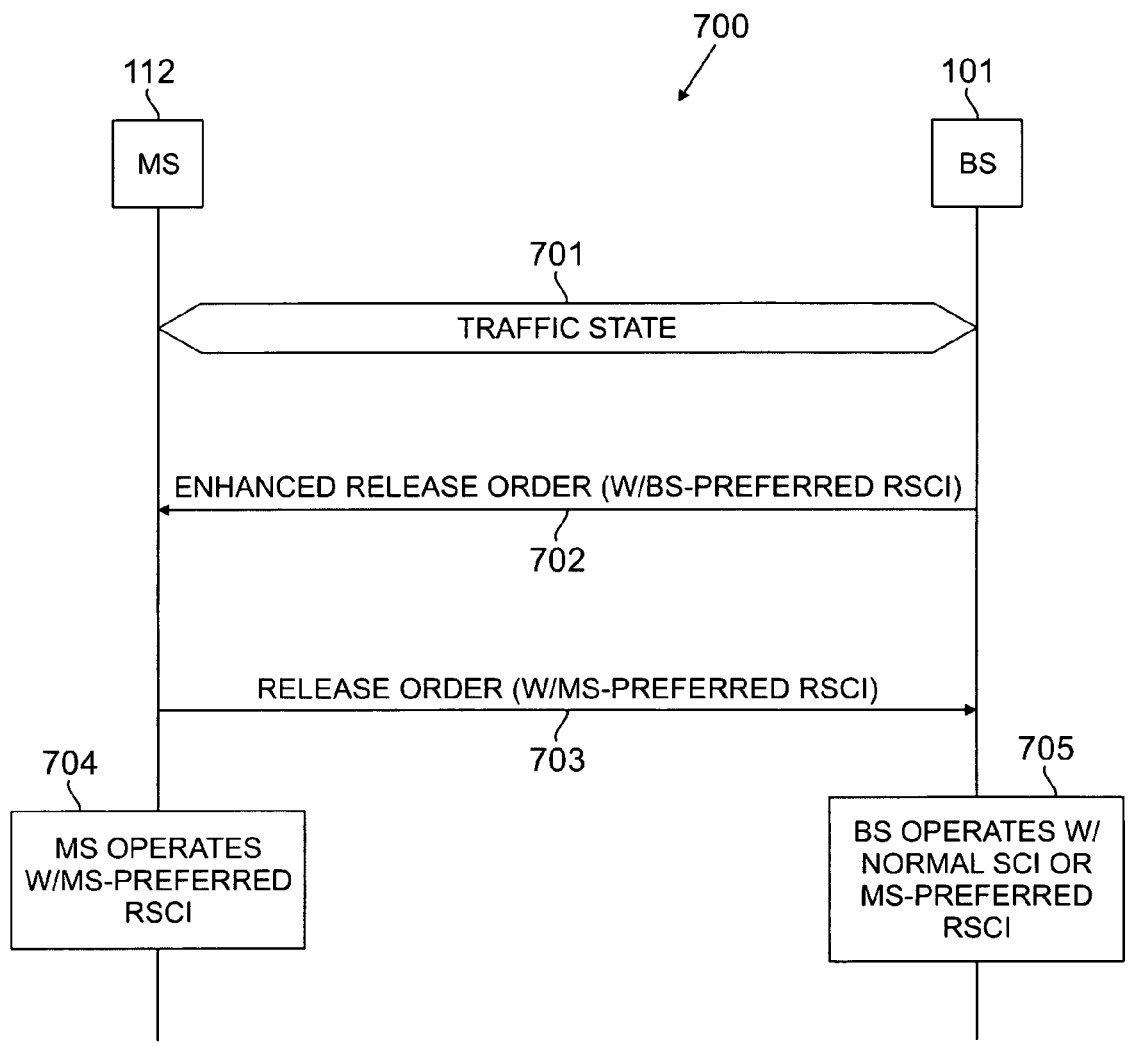
FIG. 7 illustrates a message flow diagram for selecting the reduced slot cycle index value of a particular mobile station according to one embodiment of the present invention.

FIG. 7 illustrates message flow diagram 700, which depicts a technique for enabling a particular mobile station to use the reduced slot cycle mode according to one embodiment of the present invention. Initially, MS 112 is operating in a traffic state 701 (e.g., engaged in a traffic session with BS 101). At some point, the traffic session ends (e.g., the call is ended or disconnected), and BS 112 transmits to MS 112 Enhanced Release Order message 702, which has been modified to include a data field that contains the preferred reduced slot cycle index (RSCI) value at which BS 101 wants MS 112 to operate.

In response, MS 112 transmits Release Order message 703, which has been modified to include a data field that contains the preferred RSCI value that MS 112 will operate at. In one embodiment, the MS-preferred RSCI in Release Order message 703 is identical to the BS-preferred RSCI received in Enhanced Release Order message 702 if the BS-preferred RSCI is acceptable to MS 112. In another embodiment, the MS-preferred RSCI in Release Order message 703 is different from the BS-preferred RSCI. Optionally, MS 112 may include a time period in Release Order message 703 during which MS 112 will operate using the MS-preferred RSCI.

Thereafter, MS 112 operates with the MS-preferred RSCI value, as indicated by event block 704, and BS 101 operates with either the MS-preferred RSCI value or a normal SCI value, as indicated by event block 705. BS 101 operates with the MS-preferred RSCI value if the MS-preferred RSCI value is acceptable to BS 101. If BS 101 is operating with a normal SCI value, BS 101 sends paging messages to MS 112 within a selected subset of the paging channel slots, as determined by the SCI value, while MS 112 monitors all of the paging channel slots (since the period of reduced slotted mode operation is a fraction of the slot cycle period of 1.28 seconds), thereby ensuring that MS 112 does not miss any paging messages from BS 101.

Figure 8:
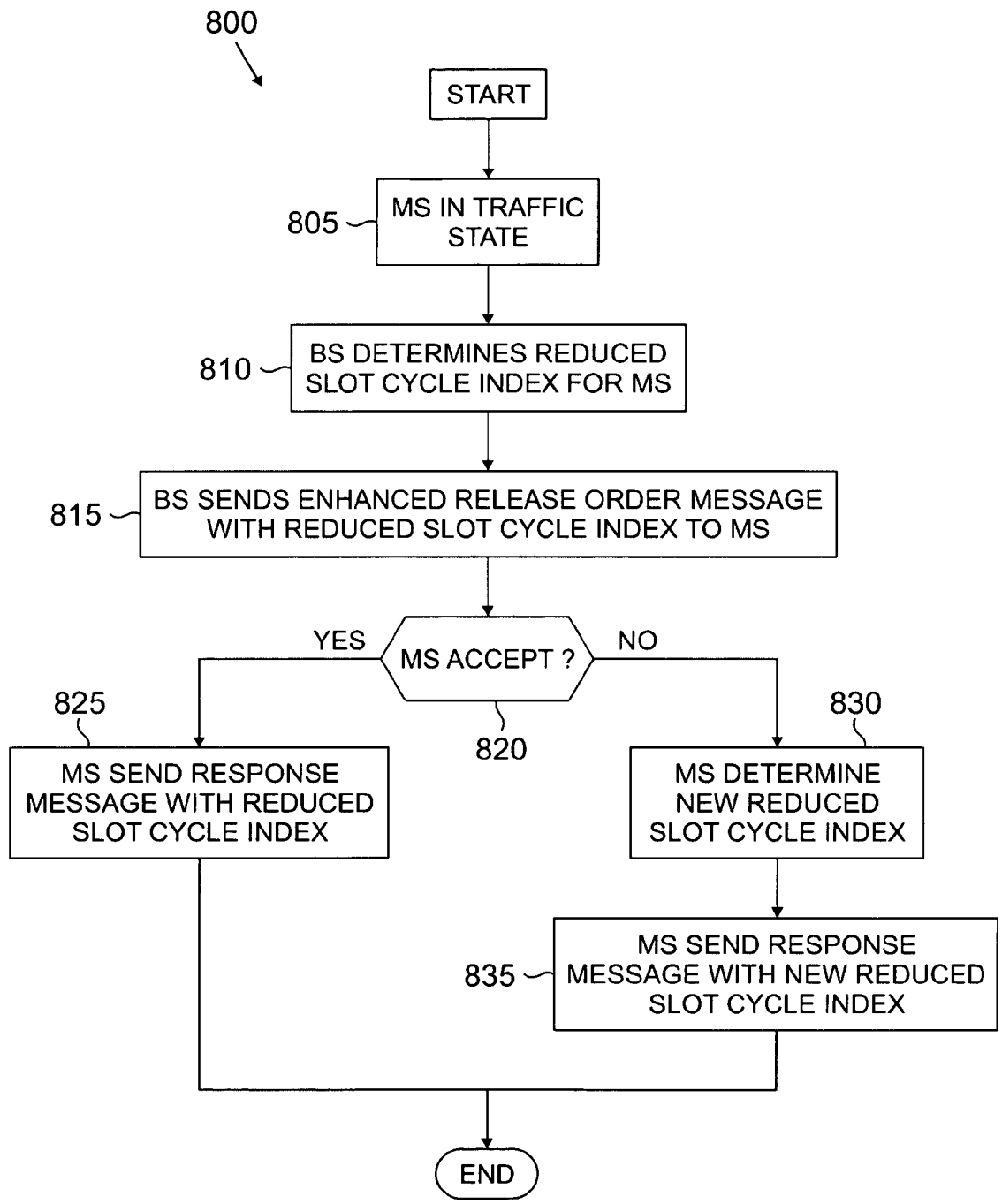
FIG. 8 is a flow diagram illustrating the selection of the reduced slot cycle mode for a particular mobile station in the wireless network according to one embodiment of the present invention.

FIG. 8 depicts flow diagram 800, which illustrates the selection of the reduced slot cycle mode for a particular mobile station in the wireless network according to one embodiment of the present invention. Initially, mobile station 112 is in a traffic state during a session with base station 101 (process step 805). When the session is terminated, base station 101 determines a reduced slot cycle index value for mobile station 112 based on a service associated with mobile station 112 and the reduced slot cycle index values supported by base station 101 (process step 810). For example, the service can be a gaming application, Push-to-Talk, QCHAT, a normal telecommunication service or other type of service.

Base station 101 then transmits an enhanced release order message to mobile station 112, which includes a data field identifying the preferred reduced slot cycle index value at which base station 101 would like mobile station 112 to operate (process step 815). If the reduced slot cycle index value received in the enhanced release order message is acceptable to mobile station 112 (Y branch of decision step 820), mobile station 112 sends a response message (e.g., release order message or other acknowledgment message) to base station 101, which includes a data field identifying the reduced slot cycle index value sent by base station 101 (process step 825) to confirm that mobile station 112 will operate at the reduced slot cycle index value upon release of the traffic channel.

If the reduced slot cycle index value received in the enhanced release order message is not acceptable to mobile station 112 (N branch of decision step 820), mobile station 112 determines a new reduced slot cycle index value at which mobile station 112 will operate (process step 830). Mobile station 112 then sends a response message (e.g., release order message or other acknowledgment message) to base station 101, which includes a data field identifying the new reduced slot cycle index value determined by mobile station 112 (process step 835) to inform base station 101 that mobile station 112 will operate at the new reduced slot cycle index value upon release of the traffic channel.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a base station capable of enabling the use of the reduced slot cycle mode by each of a plurality of mobile stations communicating with said base station, said base station comprising:

a reduced slot cycle controller capable of causing said base station to transmit an enhanced release order message to a first one of said plurality of mobile stations to transition said first mobile station from a traffic state to an idle state, wherein said enhanced release order message comprises a first data field containing a first reduced slot cycle index value to be used by said first mobile station, and wherein said reduced slot cycle controller is further capable of causing said base station to transmit an additional enhanced release order message to a second one of said plurality of mobile stations, wherein said additional enhanced release order message comprises a first data field containing a second reduced slot cycle index value to be used by said second mobile station.

2. The base station as set forth in claim 1, wherein said reduced slot cycle controller is further capable of selecting said first reduced slot cycle index value based on a first service associated with said first mobile station and said second reduced slot cycle index value based on a second service associated with said second mobile station.

3. The base station as set forth in claim 1 wherein said reduced slot cycle controller is further capable of receiving a response message from said first mobile station, wherein said response message comprises a first data field containing a second reduced slot cycle index value to be used by said first mobile station.

4. The base station as set forth in claim 3 wherein said second reduced slot cycle index value and said first reduced slot cycle index value are the same, and wherein said base station operates at said first reduced slot cycle index value to page said first mobile station.

5. The base station as set forth in claim 3 wherein said second reduced slot cycle index value and said first reduced slot cycle index value are different.

6. The base station as set forth in claim 5 wherein said base station operates at said second reduced slot cycle index value to page said first mobile station.

7. The base station as set forth in claim 5 wherein said base station operates at a normal slot cycle index value to page said first mobile station.

8. For use in a wireless network, a mobile station capable of using the reduced slot cycle mode when communicating with a base station, said mobile station comprising:

a slotted mode controller capable of receiving an enhanced release order message from said base station to cause said mobile station to transition from a traffic state to an idle state, wherein said enhanced release order message comprises a first data field containing a first reduced slot cycle index value to be used by said mobile station, and wherein said slotted mode controller is further capable of transmitting a response message to said base station, wherein said response message comprises a first data field containing a second reduced slot cycle index value to be used by said mobile station.

9. The mobile station as set forth in claim 8 wherein mobile station operates at said first reduced slot cycle index value to receive page messages from said base station.

10. The mobile station as set forth in claim 8 wherein said second reduced slot cycle index value and said first reduced slot cycle index value are the same, and wherein said mobile station operates at said first reduced slot cycle index value.

11. The mobile station as set forth in claim 8 wherein said second reduced slot cycle index value and said first reduced slot cycle index value are different, and wherein said mobile station operates at said second reduced slot cycle index value.

12. The mobile station as set forth in claim 8 wherein said response message is a release order message.

13. The mobile station as set forth in claim 8 wherein said response message is an acknowledgment message.

14. For use in a wireless network, a method of enabling the use of the reduced slot cycle mode by each of a plurality of mobile stations communicating with a base station, the method comprising the step of:
    transmitting an enhanced release order message to a first one of said plurality of mobile stations to transition said first mobile station from a traffic state to an idle state, wherein said enhanced release order message comprises a first data field containing a first reduced slot cycle index value to be used by said first mobile station; and
    transmitting an additional enhanced release order message to a second one of said plurality of mobile stations, wherein said additional enhanced release order message comprises a first data field containing a second reduced slot cycle index value to be used by said second mobile station.

15. The method as set forth in claim 14 wherein said step of transmitting further comprises the step of:
    selecting said first reduced slot cycle index value based on a service associated with said first mobile station.

16. The method as set forth in claim 14 further comprising the step of:
    receiving a response message from said first mobile station, wherein said response message comprises a first data field containing a second reduced slot cycle index value to be used by said first mobile station.

17. The method as set forth in claim 16 wherein said second reduced slot cycle index value and said first reduced slot cycle index value are the same, and further comprising the step of:
    operating said base station at said first reduced slot cycle index value to page said first mobile station.

18. The method as set forth in claim 17, further comprising the step of:
    operating said base station at said second reduced slot cycle index value to page said first mobile station.

19. The method as set forth in claim 16 wherein said second reduced slot cycle index value and said first reduced slot cycle index value are different.

20. The method as set forth in claim 19 further comprising the step of:
    operating said base station at a normal slot cycle index value to page said first mobile station.

* * * * *